United States Patent Office 3,469,827
Patented Sept. 30, 1969

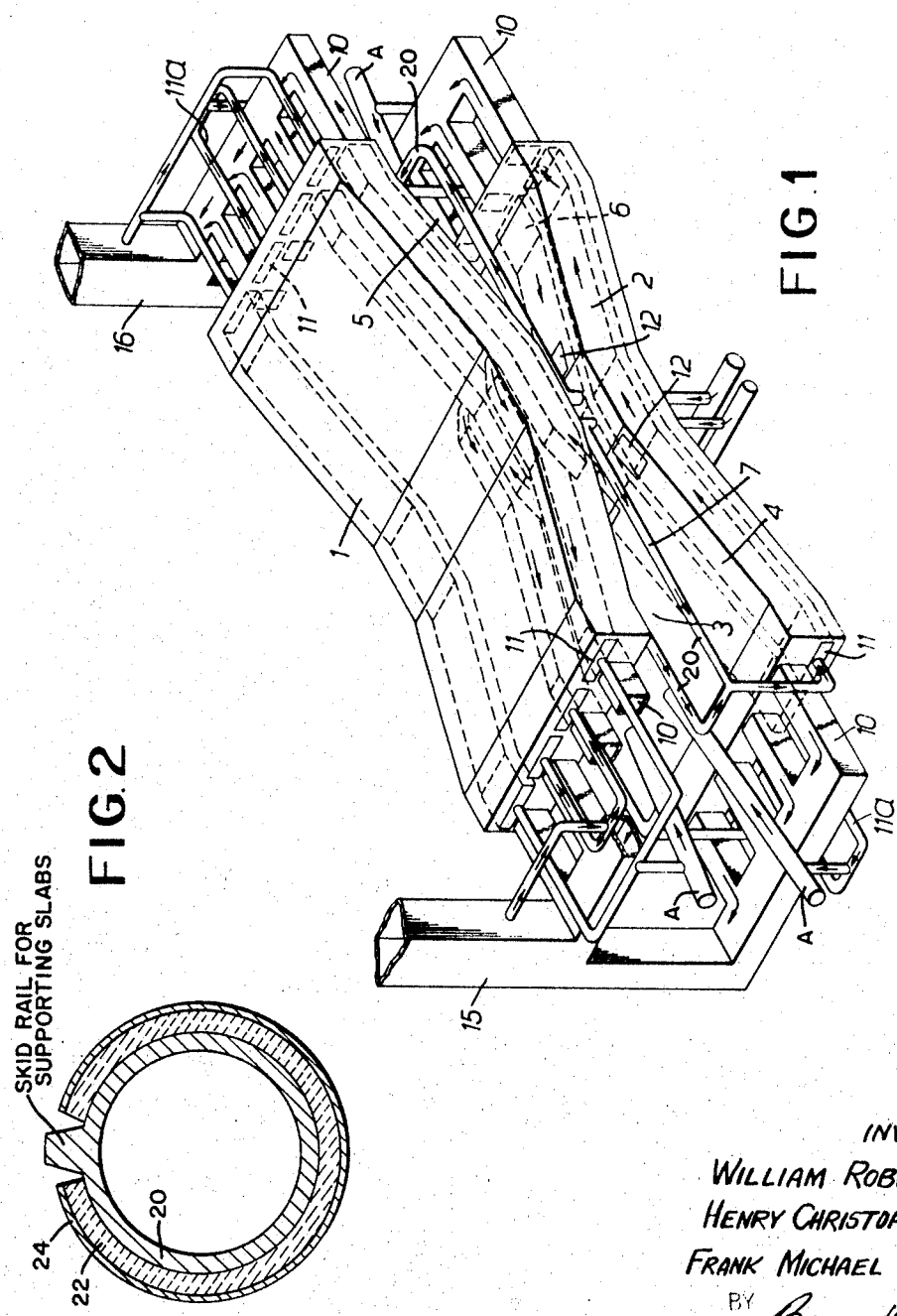

3,469,827
FURNACE
William Robert Laws, Worcester Park, Henry Christopher Holt, London, and Frank Michael Salter, Chatham, England, assignors to The British Iron and Steel Research Association
Filed Dec. 1, 1967, Ser. No. 687,352
Claims priority, application Great Britain, Dec. 2, 1966, 53,994/66
Int. Cl. F27b 9/14; F27d 3/00, 17/00
U.S. Cl. 263—6       11 Claims

ABSTRACT OF THE DISCLOSURE

This invention relates to a continuous slab reheating furnace comprising roof and well walls of cavity construction forming channels extending along the length of the walls for the passage through different channels of waste furnace gases and combusition air for the furnace burners so that the combustion air may be preheated. The combustion air for the upper zone burners is further preheated by low temperature recuperators positioned externally of the walls and heated by the waste gases and the combustion air for the lower zone burners is further preheated by passing it through hollow slab-supported skids.

---

This invention relates to continuous slab reheating furnaces.

It is an object of the invention to provide such a furnace having improved means whereby accurate temperature control and a high furnace efficiency is achieved.

According to the invention, there is provided a continuous slab reheating furnace comprising a skid arrangement for supporting the slabs during their path from one end of the furnace to the other, burners arranged above and below the path of the slabs at each end of the furnace, and waste gas offtakes positioned intermediate the ends of the furnace.

Features and advantages of the invention will be apparent from the following description of an embodiment thereof given, by way of example, in conjunction with the accompanying drawings, wherein:

FIGURE 1 is a diagrammatic illustration of a four zone continuous slab reheating furnace according to the invention; and FIGURE 2 is a cross-sectional view of a coated skid pipe.

Referring to FIGURE 1, the reheating furnace is reverse fired and comprises a roof wall 1 and well wall 2 defining upper and lower preheat zones 3 and 4 and upper and lower tonnage zones 5 and 6; the side walls of the furnace are omitted for clarity. Burners A for heating each of zones 3 to 6 are mounted on each end wall of the furnace above and below skid arrangement 7, as shown in the figure, and are readily accessible for maintenance. The slabs during their passage through the furnace, are supported on skid arrangement 7 including hollow skids. Walls 1 and 2 are of a cavity construction and are constructed as ceramic recuperators, in which waste gases pass through ducts 10 positioned next to the furnace lining and in which combustion air ducts 11 run adjacent and outside the ducts 10 and are backed by a suitable thickness of insulation (not shown). To reduce still further heat losses through the furnace walls 1, 2, the walls may be formed from low-density, high-temperature insulating bricks, the cavity walls may have reflecting surfaces and may be of a composite sandwich structure. The furnace offtakes 12 for the waste gases are situated between the preheat and tonnage zones, the waste gases from each zone leaving through four separate ducts. Preliminary flow studies for the furnace, show that an adequate flow of the waste gases may be obtained from the tonnage zones into the offtakes without flow from the preheat zones; provided that the preheat chambers are adequately sealed except for the narrow open end, then ingress of gases cannot occur. With this feature, the preheat fuel may be shut off, and the roof and well temperatures may be dropped rapidly to 1000° C. in the event of a stoppage. Prevention of waste-gas carry over from the tonnage zone will allow this process to proceed rapidly. During passage through the walls 1 and 2, the temperature of the waste gases drops to about 1000° C.; the waste gases on leaving the walls 1 and 2 are directed to two metallic recuperators 15, 16 positioned one at each end of the furnace. Combustion air for the upper zones 3, 5 is preheated in recuperators 15, 16 to 600° C. and passes through the complete length of the ducts 11 in wall 1 and pipes 11a to enter the burners A at 1000° C. The combustion air for the lower zones 4, 6 passes through the skids and then along the complete length of the wall 2 and pipes 11a to the burners A. A similar degree of preheat to the air for the upper zone burners may be achieved.

Heat loss to the skid arrangement 7 can be reduced, as shown in FIGURE 2, by coating the skid pipes 20 with a thin layer of refractory material 22 and reduced still further by a further outer coating of a highly reflective material 24; with fans of the type at present in use and with skid pipes made from the Nimonic series of materials, the skid pipes could operate at 700°–800° C. for tens of thousands of hours at the stresses involved. The residual heat loss to the skid pipes would be substantially eliminated by the combustion air whose temperature at the exit from the skid arrangement would be in the region of 600° C.

The above described skid arrangement will reduce skid marks, that is longitudinal temperature differences in the slab due to contact with the skids, to an insignificant level.

In accordance with our observations, skid marks may be further reduced by changing the section of the skids someway along the length of the furnace. This is because the initial skid mark is due to shielding while the later mode of heat transfer is one of shielding and re-radiation from the slab to the skid. Thus in the preheat zone, a small diameter metallic skid pipe would be used operating at about 800° C. on its outer surface, while in the tonnage zone a similar skid running at 800° C. would be coated with refractory of sufficient thickness to raise its surface temperature to 1250° C.

In the above described furnace, considerable gains in furnace efficiency up to 40% saving in fuel costs are achieved by eliminating skid losses together with reducing the heat loss in the waste gases. Elimination of skid losses automatically reduces considerably the formation of skid marks within the slab and hence removes the need for a soak zone. Slabs can be released from the furnace with a surface-to-centre temperature gradient sufficient to compensate for radiation losses through the primary stands of the mill. Since these conditions are achieved, a top-and-bottom fired 4-zone furnace having a shorter hearth length than existing furnaces but providing a similar throughput is produced. A furnace with say a hearth length of 100 ft. should be able to heat up to 400 ton/h. In addition adoption of a cavity-wall roof and well for preheating combustion air reduces the thermal capacity of the furnace structure by a factor of about 5, thus allowing rapid variations in furnace temperature corresponding to variations in fuel input and hence would be conducive to improved furnace control.

We claim:

1. A continuous slab reheating furnace comprising preheat and tonnage zones only, burners arranged above and below the path of the slabs at each of opposed ends of the furnace, the preheat zones being heated by the burners at one of said ends and the tonnage zones being heated by the burners at the other of said ends, waste gas offtakes positioned intermediate said ends of the furnace for receiving waste gases from said zones, and a skid arrangement in the preheat zones and in the tonnage zones for supporting the slabs during their path from one end of the furnace to the other, the skid arrangement in the preheat zones being metal and that in the tonnage zones being metal with a refractory coating thereon so as to reduce the heat loss thereof and thus minimize the formation of skid marks in the slabs.

2. A furnace according to claim 1 wherein the furnace includes a roof wall and a well wall, one of said walls comprising a ceramic recuperator receiving hot waste gases from the offtakes and receiving combustion air for the burners whereby to preheat the combustion air, said one wall having first channel means, for passage therethrough of hot waste gases, formed therein and extending along the path of the slabs and second channel means, for passage therethrough of combustion air, formed therein and disposed adjacent said first channels; and passage means connecting the second channel means with the burners.

3. A furnace according to claim 2 wherein the other of said walls comprises a ceramic recuperator receiving hot waste gases from the offtakes and receiving combustion air for the burners whereby to preheat said combustion air, said other wall having first channel means, for passage therethrough of hot waste gases, formed therein and extending along the path of the slabs and second channel means, for passage therethrough of combustion air, formed therein and disposed adjacent said first channels; and passage means connecting the second channel means of said other wall with the burners.

4. A furnace according to claim 3 and including a low temperature recuperator positioned externally of the furnace walls; duct means connecting the channel means for the passage of hot waste gases of at least one of said walls with said low temperature recuperator, and combustion air inlet ducts connecting said low temperature recuperator with said combustion air channel means of at least one of said walls for heating by means of waste gases leaving the furnace the combustion air before the air is preheated in the ceramic recuperator.

5. A furnace according to claim 2 wherein the channels for the waste gases and combustion air extend along the entire length of said one wall.

6. A furnace according to claim 2 wherein said one wall is the roof wall.

7. A furnace according to claim 2 wherein said skids are tubular and the interior thereof is in communication with the combustion air channels in said one furnace wall, the combustion air passing through the skids before passing through said channels.

8. A furnace according to claim 1 wherein the cross-section of the skids is changed at a point along the length of the furnace.

9. A furnace according to claim 8, wherein the skids in the preheat zone are of small diameter metallic pipe and wherein the skids in the tonnage zone are provided by metallic pipes covered with a refractory coating.

10. A furnace according to claim 9, wherein the refractory coating is covered with a layer of highly reflective material.

11. A furnace according to claim 2, wherein at said one furnace wall is formed from low-density, high-temperature insulating bricks, the walls of at least said first channel means having highly reflective surfaces.

References Cited

UNITED STATES PATENTS

| | | | |
|---|---|---|---|
| 2,157,221 | 5/1939 | Spencer et al. | 263—6 |
| 2,762,618 | 9/1956 | Johnson et al. | 263—20 X |
| 3,305,109 | 2/1967 | Kerr | 263—6 X |

JOHN J. CAMBY, Primary Examiner

U.S. Cl. X.R.

263—15, 20